US008744905B2

(12) United States Patent
Robinson et al.

(10) Patent No.: US 8,744,905 B2
(45) Date of Patent: Jun. 3, 2014

(54) SYSTEM, METHOD AND COMPUTER READABLE MEDIUM FOR BILLING TOLLS

(75) Inventors: Benjamin P. Robinson, Plano, TX (US); Debbie Lemon, Carrollton, TX (US); Sarath K. Balachandran, Irving, TX (US)

(73) Assignee: Rent A Toll, Ltd., Carrollton, TX (US)

( * ) Notice: Subject to any disclaimer, the term of this patent is extended or adjusted under 35 U.S.C. 154(b) by 98 days.

(21) Appl. No.: 12/433,479

(22) Filed: Apr. 30, 2009

(65) Prior Publication Data

US 2010/0114675 A1 May 6, 2010

Related U.S. Application Data

(63) Continuation of application No. 11/516,380, filed on Sep. 6, 2006.

(60) Provisional application No. 60/714,717, filed on Sep. 7, 2005.

(51) Int. Cl.
*G06Q 99/00* (2006.01)

(52) U.S. Cl.
USPC .............................. 705/13; 705/1.1; 705/7.11

(58) Field of Classification Search
USPC ............................................ 705/13, 1.1, 7.11
See application file for complete search history.

(56) References Cited

U.S. PATENT DOCUMENTS

| 4,510,495 A | 4/1985 | Sigrimis et al. |
| 4,546,241 A | 10/1985 | Walton |
| 4,665,395 A | 5/1987 | Van Ness |
| 5,086,389 A | 2/1992 | Hassett et al. |
| 5,263,118 A | 11/1993 | Cornelison |
| 5,310,999 A | 5/1994 | Claus et al. |
| 5,381,155 A | 1/1995 | Gerber |
| 5,396,417 A | 3/1995 | Burks et al. |
| 5,485,520 A | 1/1996 | Chaum et al. |
| 5,525,991 A | 6/1996 | Nagura et al. |
| 5,602,919 A | 2/1997 | Hurta |

(Continued)

FOREIGN PATENT DOCUMENTS

| EP | 0780801 A1 | 6/1997 |
| EP | 0784297 A2 | 7/1997 |
| JP | 2004213569 | 7/2004 |
| JP | 2004227259 A | 8/2004 |

OTHER PUBLICATIONS

Copenheaver, Blaine R., "International Search Report" for PCT/US2009/060352 as mailed Dec. 10, 2009, (4 pages).

(Continued)

*Primary Examiner* — Akiba Allen
(74) *Attorney, Agent, or Firm* — Winstead PC

(57) ABSTRACT

Billing tolls accumulated during a rental period comprises a third party entity, a toll authority, and a toll rental entity coupled to the third party entity and to the toll authority, wherein the third party entity sends a request for service to the toll rental entity, wherein the toll rental entity sends the request for service during the rental period to the toll authority, wherein the toll authority stores the request, wherein the toll authority sends toll data to the toll rental entity based on the request, wherein the toll rental entity sends toll rental data to the third party entity based on the toll data, and wherein the third party entity generates a bill based on the toll rental data.

20 Claims, 14 Drawing Sheets

(56) References Cited

U.S. PATENT DOCUMENTS

| | | |
|---|---|---|
| 5,805,209 A | 9/1998 | Yuge et al. |
| 5,809,480 A * | 9/1998 | Chasek .................. 705/13 |
| 5,819,234 A | 10/1998 | Slavin et al. |
| 5,825,007 A | 10/1998 | Jesadanont et al. |
| 5,935,190 A | 8/1999 | Davis |
| 5,948,038 A | 9/1999 | Daly |
| 5,991,749 A | 11/1999 | Morrill, Jr. |
| 6,052,068 A | 4/2000 | Price R-W et al. |
| 6,087,963 A | 7/2000 | Kobayashi et al. |
| 6,111,523 A | 8/2000 | Mee |
| 6,163,277 A | 12/2000 | Gehlot |
| 6,175,800 B1 | 1/2001 | Mori et al. |
| 6,181,259 B1 | 1/2001 | Yamashita |
| 6,191,705 B1 | 2/2001 | Oomen et al. |
| 6,195,019 B1 | 2/2001 | Nagura |
| 6,198,913 B1 | 3/2001 | Sung et al. |
| 6,198,987 B1 | 3/2001 | Park et al. |
| 6,218,963 B1 | 4/2001 | Kawanabe et al. |
| 6,233,519 B1 | 5/2001 | Yamada |
| 6,243,029 B1 | 6/2001 | Tomer |
| 6,252,523 B1 | 6/2001 | Mostrom |
| 6,252,524 B1 | 6/2001 | Takikita |
| 6,275,552 B1 | 8/2001 | Ando |
| 6,278,935 B1 | 8/2001 | Kaplan et al. |
| 6,285,858 B1 | 9/2001 | Yoshida |
| 6,300,882 B1 | 10/2001 | Inoue |
| 6,308,893 B1 | 10/2001 | Waxelbaum et al. |
| 6,317,721 B1 | 11/2001 | Hurta et al. |
| 6,326,900 B2 | 12/2001 | DeLine et al. |
| 6,337,639 B1 | 1/2002 | Kojima |
| 6,340,934 B1 | 1/2002 | Hisada |
| 6,342,844 B1 | 1/2002 | Rozin |
| 6,344,806 B1 | 2/2002 | Katz |
| 6,347,739 B1 | 2/2002 | Tamam |
| 6,373,402 B1 | 4/2002 | Mee |
| 6,388,579 B1 | 5/2002 | Adcox et al. |
| 6,390,365 B1 | 5/2002 | Karasawa |
| 6,390,429 B1 | 5/2002 | Brincat |
| 6,396,418 B2 | 5/2002 | Naito |
| 6,411,889 B1 | 6/2002 | Mizunuma et al. |
| 6,437,706 B2 | 8/2002 | Sato et al. |
| 6,446,049 B1 | 9/2002 | Janning et al. |
| 6,449,555 B1 | 9/2002 | Ohba et al. |
| 6,459,385 B2 | 10/2002 | Yamashita |
| 6,463,384 B1 | 10/2002 | Kaplan et al. |
| 6,490,443 B1 | 12/2002 | Freeny, Jr. |
| 6,509,843 B1 | 1/2003 | Fuyama |
| 6,538,580 B2 | 3/2003 | Bostrom et al. |
| 6,542,815 B1 | 4/2003 | Ishizaki et al. |
| 6,546,119 B2 | 4/2003 | Ciolli et al. |
| 6,603,406 B2 | 8/2003 | Jambhekar |
| 6,642,851 B2 | 11/2003 | Deline et al. |
| 6,653,946 B1 | 11/2003 | Hassett |
| 6,658,392 B2 | 12/2003 | Yoshida |
| 6,658,775 B1 | 12/2003 | Lanzisero |
| 6,661,352 B2 | 12/2003 | Tiernay et al. |
| 6,683,580 B2 | 1/2004 | Kuramoto |
| 6,683,956 B1 | 1/2004 | Aikawa et al. |
| 6,684,155 B1 | 1/2004 | Chen et al. |
| 6,705,521 B1 | 3/2004 | Wu et al. |
| 6,725,202 B1 | 4/2004 | Hurta et al. |
| 6,737,986 B2 | 5/2004 | Fuyama |
| 6,744,377 B1 | 6/2004 | Inoue |
| 6,756,915 B2 | 6/2004 | Choi |
| 6,774,810 B2 | 8/2004 | Deline |
| 6,791,475 B2 | 9/2004 | Yamashita |
| 6,796,499 B1 | 9/2004 | Wang |
| 6,816,707 B1 | 11/2004 | Barker et al. |
| 6,834,267 B1 | 12/2004 | Fuyama |
| 6,856,820 B1 | 2/2005 | Kolls |
| 6,883,710 B2 | 4/2005 | Chung |
| 6,909,876 B2 | 6/2005 | Higashino et al. |
| 6,920,379 B2 | 7/2005 | Miyamoto |
| 6,937,162 B2 | 8/2005 | Tokitsu et al. |
| 6,985,827 B2 | 1/2006 | Williams et al. |
| 7,053,793 B2 | 5/2006 | Tajima et al. |
| 7,080,070 B1 | 7/2006 | Gavarini |
| 7,104,447 B1 | 9/2006 | Lopez et al. |
| 7,970,644 B2 | 6/2011 | Hedley et al. |
| 2001/0019307 A1 | 9/2001 | Sato et al. |
| 2001/0025251 A1 | 9/2001 | Konishi et al. |
| 2001/0026228 A1 | 10/2001 | Naito |
| 2001/0052880 A1 | 12/2001 | Kuramoto |
| 2002/0002534 A1 | 1/2002 | Davis et al. |
| 2002/0004741 A1 | 1/2002 | Yoshida |
| 2002/0008638 A1 | 1/2002 | Yamashita |
| 2002/0018005 A1 | 2/2002 | Fuyama |
| 2002/0032506 A1 | 3/2002 | Tokitsu et al. |
| 2002/0046128 A1 | 4/2002 | Abe et al. |
| 2002/0052837 A1 | 5/2002 | Bouthors |
| 2002/0067291 A1 | 6/2002 | Ikeda |
| 2002/0072963 A1 | 6/2002 | Jonge |
| 2002/0080048 A1 | 6/2002 | Choi |
| 2002/0089431 A1 | 7/2002 | Fuyama |
| 2002/0097178 A1 | 7/2002 | Thomas et al. |
| 2002/0105440 A1 | 8/2002 | Bostrom et al. |
| 2002/0111851 A1 | 8/2002 | Folkers |
| 2002/0115410 A1 | 8/2002 | Higashino et al. |
| 2002/0145039 A1 | 10/2002 | Carroll |
| 2002/0145542 A1 | 10/2002 | Yamashita |
| 2002/0178050 A1 | 11/2002 | Sone |
| 2002/0186144 A1 * | 12/2002 | Meunier .................. 340/825.28 |
| 2002/0194137 A1 | 12/2002 | Park et al. |
| 2002/0198767 A1 | 12/2002 | Kim |
| 2003/0001755 A1 | 1/2003 | Tiernay et al. |
| 2003/0026430 A1 | 2/2003 | Aikawa et al. |
| 2003/0033083 A1 | 2/2003 | Nakashima et al. |
| 2003/0046145 A1 | 3/2003 | Miao |
| 2003/0050038 A1 | 3/2003 | Haave et al. |
| 2003/0067396 A1 | 4/2003 | Hassett |
| 2003/0069784 A1 | 4/2003 | Banerjee et al. |
| 2003/0105662 A1 | 6/2003 | Koketsu et al. |
| 2003/0109223 A1 | 6/2003 | Toyama |
| 2003/0110075 A1 | 6/2003 | Shioda et al. |
| 2003/0112125 A1 | 6/2003 | Saegrov |
| 2003/0115095 A1 | 6/2003 | Yamauchi |
| 2003/0125981 A1 | 7/2003 | Pedrazzoli Pazos |
| 2003/0189498 A1 | 10/2003 | Kakihara et al. |
| 2003/0200227 A1 | 10/2003 | Ressler |
| 2004/0004120 A1 | 1/2004 | Kojima |
| 2004/0008514 A1 | 1/2004 | Lee et al. |
| 2004/0019412 A1 | 1/2004 | Miyamoto |
| 2004/0046019 A1 | 3/2004 | Kojima |
| 2004/0083130 A1 | 4/2004 | Posner et al. |
| 2004/0140355 A1 | 7/2004 | Grison |
| 2004/0146272 A1 | 7/2004 | Kessel et al. |
| 2004/0153401 A1 | 8/2004 | Gila et al. |
| 2004/0161097 A1 | 8/2004 | Henry |
| 2004/0162788 A1 | 8/2004 | Sakamoto |
| 2004/0174272 A1 | 9/2004 | Lin |
| 2004/0178929 A1 | 9/2004 | Toyama |
| 2004/0206817 A1 | 10/2004 | Grant |
| 2004/0212518 A1 | 10/2004 | Tajima et al. |
| 2004/0227616 A1 | 11/2004 | Lafferty |
| 2004/0236685 A1 | 11/2004 | Gila |
| 2004/0245302 A1 | 12/2004 | McNicholas |
| 2004/0263356 A1 | 12/2004 | Wu et al. |
| 2004/0266500 A1 | 12/2004 | Gila et al. |
| 2005/0005488 A1 | 1/2005 | Burke |
| 2005/0010478 A1 | 1/2005 | Gravelle |
| 2005/0033505 A1 | 2/2005 | Zatz |
| 2005/0034340 A1 | 2/2005 | Burke |
| 2005/0040221 A1 | 2/2005 | Schwarz, Jr. |
| 2005/0071175 A1 | 3/2005 | Gila et al. |
| 2005/0075836 A1 | 4/2005 | Taylor |
| 2005/0097018 A1 | 5/2005 | Takida |
| 2005/0102211 A1 | 5/2005 | Freeny |
| 2005/0116838 A1 | 6/2005 | Bachelder et al. |
| 2005/0119010 A1 | 6/2005 | Yasukawa |
| 2005/0157677 A1 | 7/2005 | Dowling |
| 2005/0159133 A1 | 7/2005 | Hasan et al. |
| 2005/0168351 A1 | 8/2005 | Saze et al. |
| 2005/0168352 A1 | 8/2005 | Tomer |
| 2005/0169227 A1 | 8/2005 | Dowling |

(56) References Cited

U.S. PATENT DOCUMENTS

| | | | |
|---|---|---|---|
| 2005/0169228 A1 | 8/2005 | Dowling | |
| 2005/0170824 A1 | 8/2005 | Dowling | |
| 2005/0170825 A1 | 8/2005 | Dowling | |
| 2005/0179522 A1 | 8/2005 | Saegrov | |
| 2005/0187701 A1 | 8/2005 | Baney | |
| 2005/0195841 A1 | 9/2005 | Dowling | |
| 2005/0195842 A1 | 9/2005 | Dowling | |
| 2005/0197976 A1* | 9/2005 | Tuton et al. | 705/417 |
| 2005/0198199 A1 | 9/2005 | Dowling | |
| 2005/0203892 A1 | 9/2005 | Wesley et al. | |
| 2005/0216187 A1 | 9/2005 | Hartinger | |
| 2005/0270178 A1 | 12/2005 | Ioli | |
| 2005/0279831 A1 | 12/2005 | Robinson et al. | |
| 2006/0143104 A1 | 6/2006 | Wagonheim | |
| 2006/0237528 A1 | 10/2006 | Bishop et al. | |
| 2007/0026842 A1 | 2/2007 | Haave et al. | |
| 2007/0124197 A1 | 5/2007 | Robinson et al. | |
| 2007/0124198 A1 | 5/2007 | Robinson et al. | |
| 2007/0124199 A1 | 5/2007 | Robinson et al. | |
| 2007/0126601 A1 | 6/2007 | Park | |
| 2007/0192177 A1 | 8/2007 | Robinson et al. | |
| 2007/0252678 A1 | 11/2007 | Garcia Alonso et al. | |
| 2008/0040210 A1 | 2/2008 | Hedley | |
| 2008/0062009 A1 | 3/2008 | Marton | |
| 2008/0062472 A1 | 3/2008 | Garg et al. | |
| 2008/0077417 A1 | 3/2008 | Lazzarino et al. | |
| 2008/0248819 A1 | 10/2008 | Smith et al. | |
| 2008/0249936 A1 | 10/2008 | Miller et al. | |
| 2008/0270226 A1 | 10/2008 | Archibald | |
| 2009/0089156 A1 | 4/2009 | Robinson et al. | |
| 2009/0146845 A1 | 6/2009 | Hedley | |
| 2009/0195651 A1 | 8/2009 | Leonard et al. | |
| 2010/0023452 A1 | 1/2010 | Brown | |

OTHER PUBLICATIONS

Fernandez, Paneda, J., "Supplementary European Search Report", Nov. 5, 2009, (4 pages).
U.S. Appl. No. 11/516,380, Robinson et al.
U.S. Appl. No. 11/516,376, Robinson.
U.S. Appl. No. 11/651,414, Robinson et al.
U.S. Appl. No. 11/580,527, Robinson.
U.S. Appl. No. 11/810,751, Robinson et al.
U.S. Appl. No. 11/640,550, Robinson et al.
U.S. Appl. No. 11/640,586, Robinson et al.
U.S. Appl. No. 11/803,933, Robinson et al.
U.S. Appl. No. 11/810,752, Robinson et al.
U.S. Appl. No. 11/985,985, Robinson et al.
U.S. Appl. No. 11/903,687, Robinson et al.
U.S. Appl. No. 12/268,680, Balachandran et al.
U.S. Appl. No. 12/437,621, Robinson et al.
U.S. Appl. No. 12/433,954, Robinson et al.
U.S. Appl. No. 12/437,782, Robinson et al.
"Overview of Meeting Peroceedings", 2004 IBTTA Technology Committee, Spring Technology Workshop, Miami, Floria, USA, (4 pages).
Dick Schnacke, "The 5.9 GHZ DSRC Prototype Development Program", IBTTA Technology Workshop, Madrid, Spain, Nov. 14, 2004, (37 pages).
Mehmood, Jennifer, "International Search Report for PCT/US2007/011816" as mailed Jun. 2, 2008 (3 pages).
Young, Lee W. International Search Report for PCT/US 08/10258 as mailed Nov. 10, 2008 (3 pages).
Astarita, Vittorio et al., "The use of Mobile Phones in Traffic Management and Contol", 2001 IEEE Intelligent Transportation Systems Conference Proceedings, Oakland, CA, Aug. 25-29, 2001, pp. 10-15.
"Toll Ring System; Oslo, Norway", www.eltis.org/studies/leda17.htm; retrieved Dec. 27, 2002 using archive.org., 4 pages.
Yee, Sonya, "Iron Curtain Still Bars the Road East", Oct. 19, 1998, European, p18, pp. 1-4.
U.S. Appl. No. 13/737,272, Robinson et al.
U.S. Appl. No. 13/714,961, Balachandran.

* cited by examiner

SYSTEM, METHOD AND COMPUTER READABLE MEDIUM FOR BILLING TOLLS

CROSS-REFERENCE TO RELATED APPLICATIONS

This patent application is a continuation of U.S. patent application Ser. No. 11/516,380, filed on Sep. 6, 2006. U.S. patent application Ser. No. 11/516,380 claims priority from U.S. Provisional Patent Application No. 60/714,717, titled Toll Fee System And Method Using License Plate Recognition, filed on Sep. 7, 2005. U.S. patent application Ser. No. 11/516,380 and U.S. Provisional Patent Application No. 60/714,717 are incorporated herein by reference. U.S. Pat. No. 7,407,097, titled Toll Fee System And Method and U.S. Non-Provisional patent application Ser. No. 11/516,376, titled System, Method, And Computer Readable Medium For Billing, filed on Sep. 6, 2006 and incorporated herein by reference.

FIELD OF THE INVENTION

The present invention is generally related to billing, and more specifically, to systems, methods, and computer readable media for billing tolls.

BACKGROUND OF THE INVENTION

The use of a device that permits a vehicle to pass through a toll gate without having to physically pay a charge is well known in the art. Such devices, referred to as tags, passes, or tracking devices, wirelessly transmit information to toll gate equipment that results in a charge for use of a toll road. Problems arise, however, when a rented vehicle utilizes a toll road. In such a scenario, an individual operating the rented vehicle must stop at a toll gate and physically pay currency leading to delays that are not usually experienced by vehicles using such devices.

SUMMARY OF THE INVENTION

A need exists to provide a seamless capability for billing tolls accumulated during a rental period or a service period in order to overcome the aforementioned problems.

In one embodiment of the present invention, a toll fee tracking system comprises a toll authority that collects data associated with a vehicle using license plate recognition and a toll rental entity that communicates with the toll authority and a third party.

In another embodiment of the present invention, a system for billing tolls accumulated during a rental period comprises a third party entity, a toll authority, and a toll rental entity coupled to the third party entity and to the toll authority, wherein the third party entity sends a request for service to the toll rental entity, wherein the toll rental entity sends the request for service during the rental period to the toll authority, wherein the toll authority stores the request, wherein the toll authority sends toll data to the toll rental entity based on the request, wherein the toll rental entity sends toll rental data to the third party entity based on the toll data, and wherein the third party entity generates a bill based on the toll rental data.

In a further embodiment of the present invention, a method for billing tolls accumulated during at least one of: a rental period and a service period comprises sending a service request to a toll authority, wherein the service request is associated with a license plate number, receiving license plate images from the toll authority, providing a charge during the rental period if one of the received license plate images equates to the license plate number associated with the service request, and providing a violation during the rental period if one of the received license plate images does not equate to the license plate number associated with the service request.

In yet another embodiment of the present invention, a system comprises a first module that receives a service request, wherein the service request is associated with a license plate number, and a second module that sends the service request and a payment associated with the service request, wherein the payment is utilized to provide a service at a toll authority.

In yet a further embodiment of the present invention, a computer readable medium comprises instructions for: receiving a service request comprising at least a license plate number, receiving a payment related to the service request, sending the payment to a toll authority, receiving toll usage information from the toll authority, if the toll usage is related to the license plate number, sending an acknowledgement to the toll authority, and if the toll usage is not related to the license plate number, sending a violation to the toll authority.

In yet another embodiment of the present invention, a system for billing tolls accumulated during a service period comprises a third party entity, a toll authority, and a toll rental entity coupled to the third party entity and to the toll authority, wherein the third party entity sends a request for service to the toll rental entity, wherein the toll rental entity sends the request for service during the service period to the toll authority, and wherein the toll authority sends toll data and a bill to the toll rental entity based on the request.

In yet a further embodiment of the present invention, a computer readable medium comprises instructions for: sending a payment to a toll authority, receiving a violation notification from a toll authority, wherein the violation identifies a transport, and obviating the violation if the payment was intended for the transport.

In yet another embodiment of the present invention, a method for billing tolls comprises capturing at least one picture of a license plate of a vehicle, charging the vehicle if a number associated with the captured license plate is listed in a toll rental entity database, and marking a toll violation if the number associated with the captured license plate is not listed in the toll rental entity database.

In yet a further embodiment of the present invention, a toll rental entity server that communicates toll billing data during a service period between a toll authority and a third party entity, the toll rental entity server comprises a first interface that communicates with the toll authority, at least one database, a second interface that communicates with the third party entity, wherein the communication between the toll authority and the third party entity occurs in real-time, wherein the toll rental entity server: receives a request for service from the third party entity, sends the request for service during the service period to the toll authority, and receives, based on the request, toll data and a bill from the toll authority.

BRIEF DESCRIPTION OF THE DRAWINGS

A more complete understanding of the present invention may be obtained by reference to the following Detailed Description of Illustrative Embodiments of the Invention, when taken in conjunction with the accompanying Drawings, wherein.

DETAILED DESCRIPTION OF THE INVENTION

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

Figure 1:
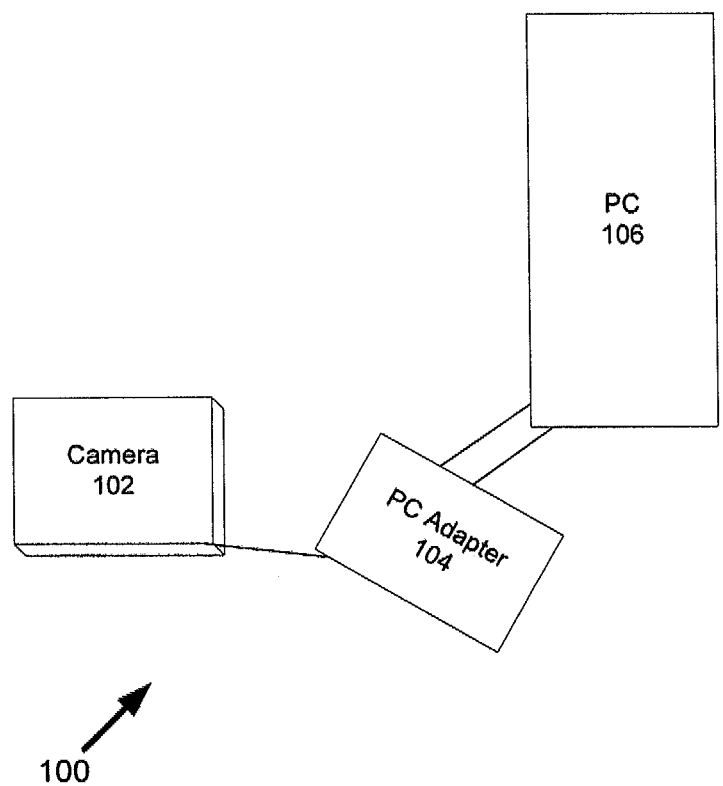
FIG. 1 depicts a block diagram of a license plate recognition module in accordance with an embodiment of the present invention.

Referring now to FIG. 1, a block diagram of a license plate recognition module or system 100 is illustrated. License Plate Recognition (LPR) is an image processing technology used to identify vehicles by their license plates. This system 100 uses camera and illumination (infra-red) to capture the vehicle images, with the help of image processing software. License plate number information will be extracted from the image. The module not only captures the vehicle image but also extracts the license plate number as a string for toll rental entity transactions and toll violation processing.

The LPR module 100 includes a sensor (not shown) which detects a vehicle coming into a toll authority. The presence of the vehicle is signaled to the illumination and camera unit for image capturing. The LPR module 100 further includes a camera and illumination unit 102. The camera and illumination unit 102 captures the front and rear side of the vehicle and brightens up a license plate of the vehicle such that clear images of the license plate of vehicles can be taken at any time. The illumination in most cases is Infra-Red (IR) which is invisible to the driver. In addition, the LPR module 100 includes a PC adapter 104 which is a hardware interface connecting the camera 102 and PC 106 to capture the image in the LPR module 100. The LPR software captures, analyzes and identifies the license plate number of vehicles and interface it with toll rental entity for authentication.

Low recognition rate is one of the key issues in using LPR software. This is due to the external efforts such as sun and headlights, bad license plates, and also due to the hardware and software quality used. Thorough testing and benchmarking are required to evaluate LPR systems. Transit speed up to 75 mph should be easily manageable by the system. Recognition rates of generic license plates (data collection) should be 99.99%. Those are the critical requirements to select LPR modules 100 for a toll rental entity interface.

Figure 2:
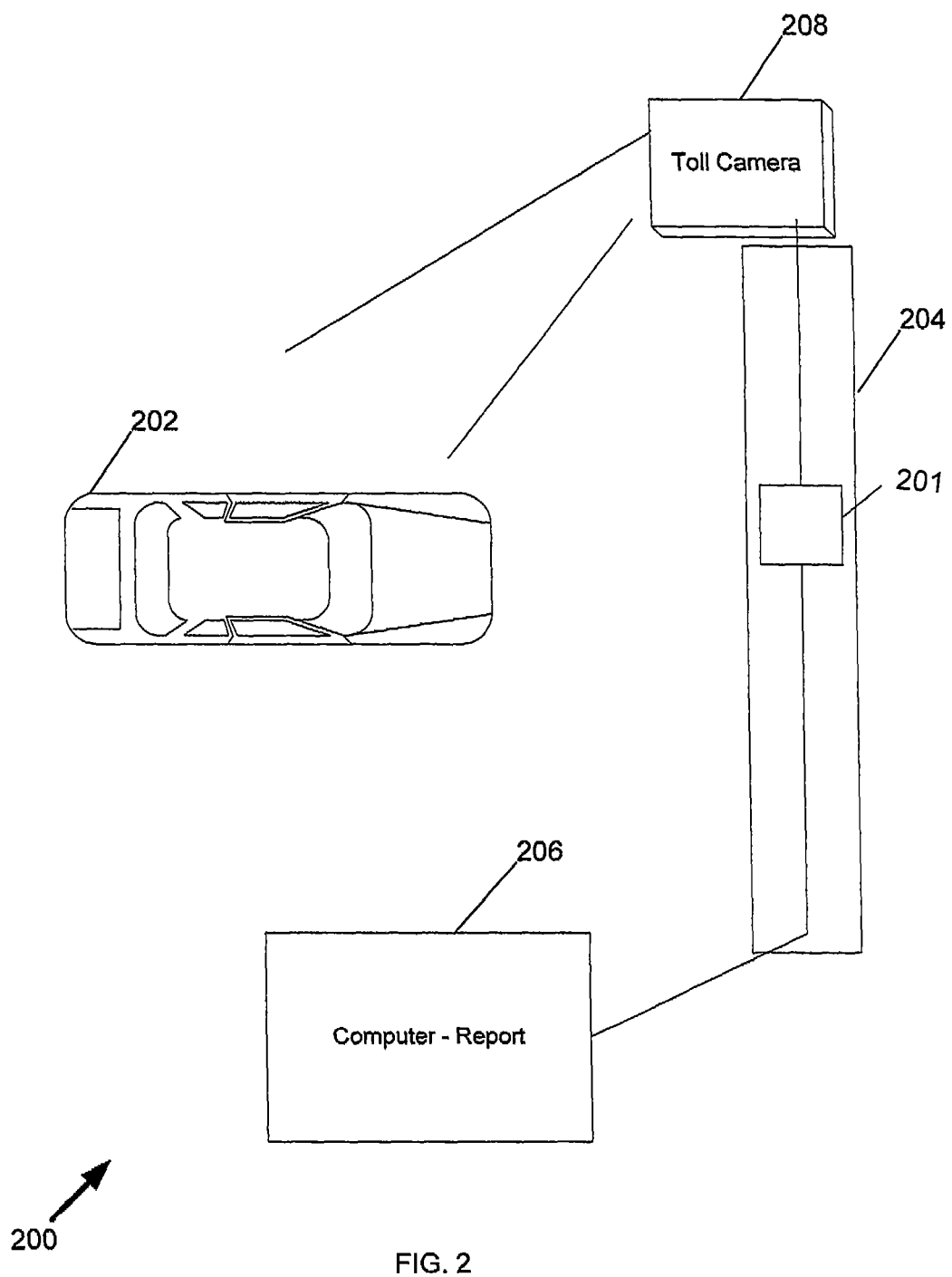
FIG. 2 depicts a license plate recognition module installed on an electronic toll collection lane.

Referring now to FIG. 2, a license plate recognition module 201 installed on an electronic toll collection lane 204 is illustrated.

Figure 3:
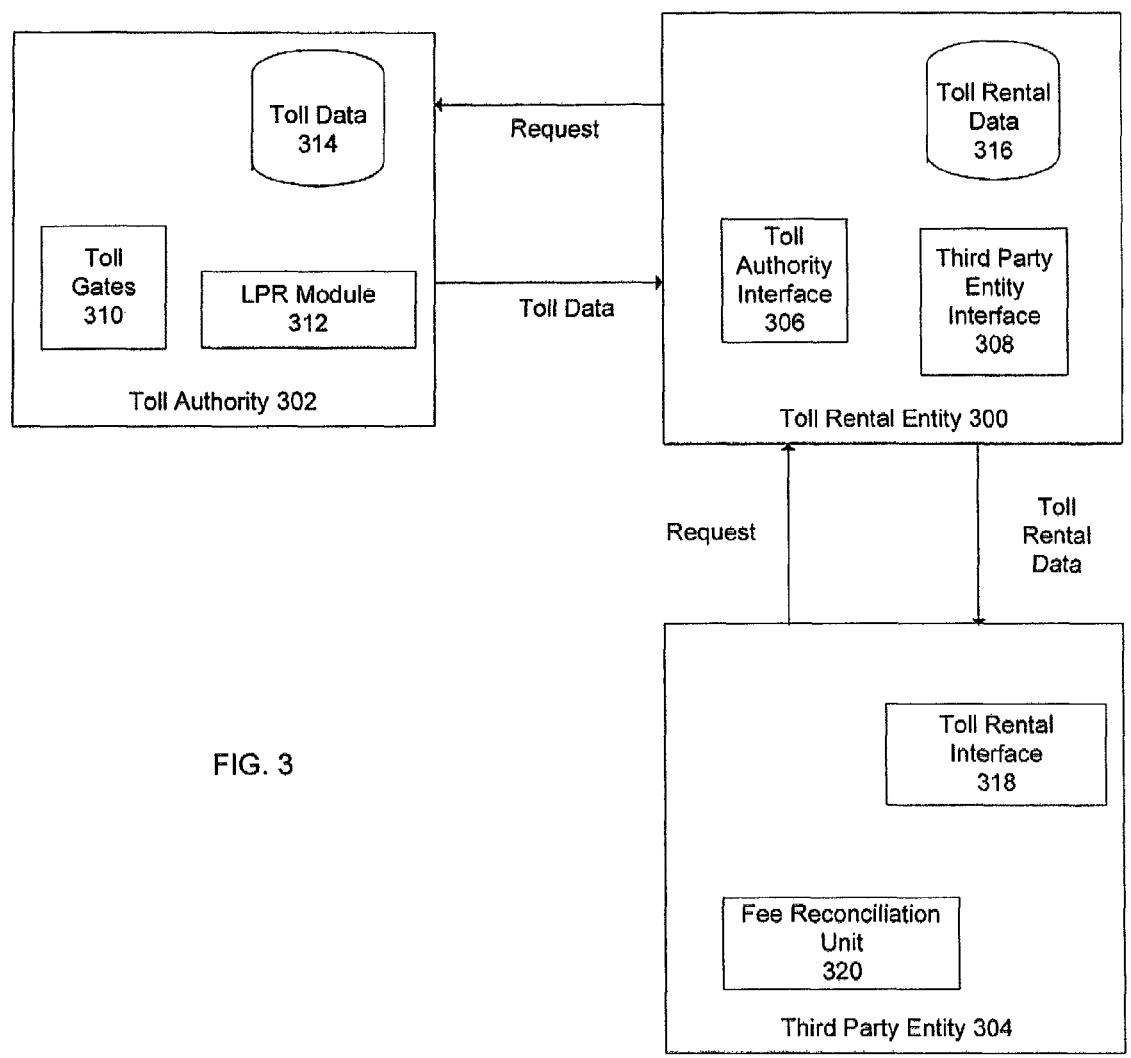
FIG. 3 depicts a block diagram of a system in accordance with an embodiment of the present invention.

Referring now to FIG. 3, a block diagram of a system of the present invention includes a toll rental entity 300 that interfaces with both a toll authority 302 and a third party entity 304. The toll rental entity 300 interacts with the toll authority 302 via a toll authority interface 306 and the third party entity 304 via a third party entity interface 308. The toll authority 302 maintains various toll gates 310, LPR modules 312 for communicating with the toll gates, and collects toll data that is stored in a toll database 314. The third party entity 304 sends a request (for example, a request for service) and includes a toll rental interface 318 that receives toll data from the toll rental entity based on the request, and a fee reconciliation unit 320 that provides account and/or billing functionality based on the received toll rental data. In alternate embodiments, any of these aforementioned module or elements may provide the functionality described or depicted.

Figure 4:
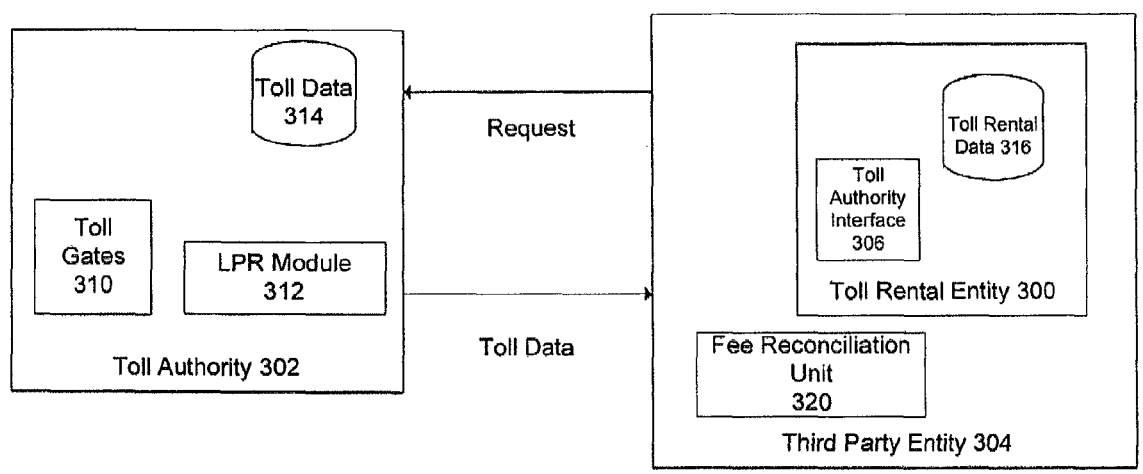
FIG. 4 depicts a block diagram of a system in accordance with an alternate embodiment of the present invention.

Referring now to FIG. 4, an alternate embodiment of a system of the present invention is illustrated. The toll rental system may be integrated into an existing operating system of the third party entity or rental agency 304. The rental agency 304 may request data directly from the toll authority 302. The rental agency 304 can then store toll rental data and reconcile accounts.

Figure 5:
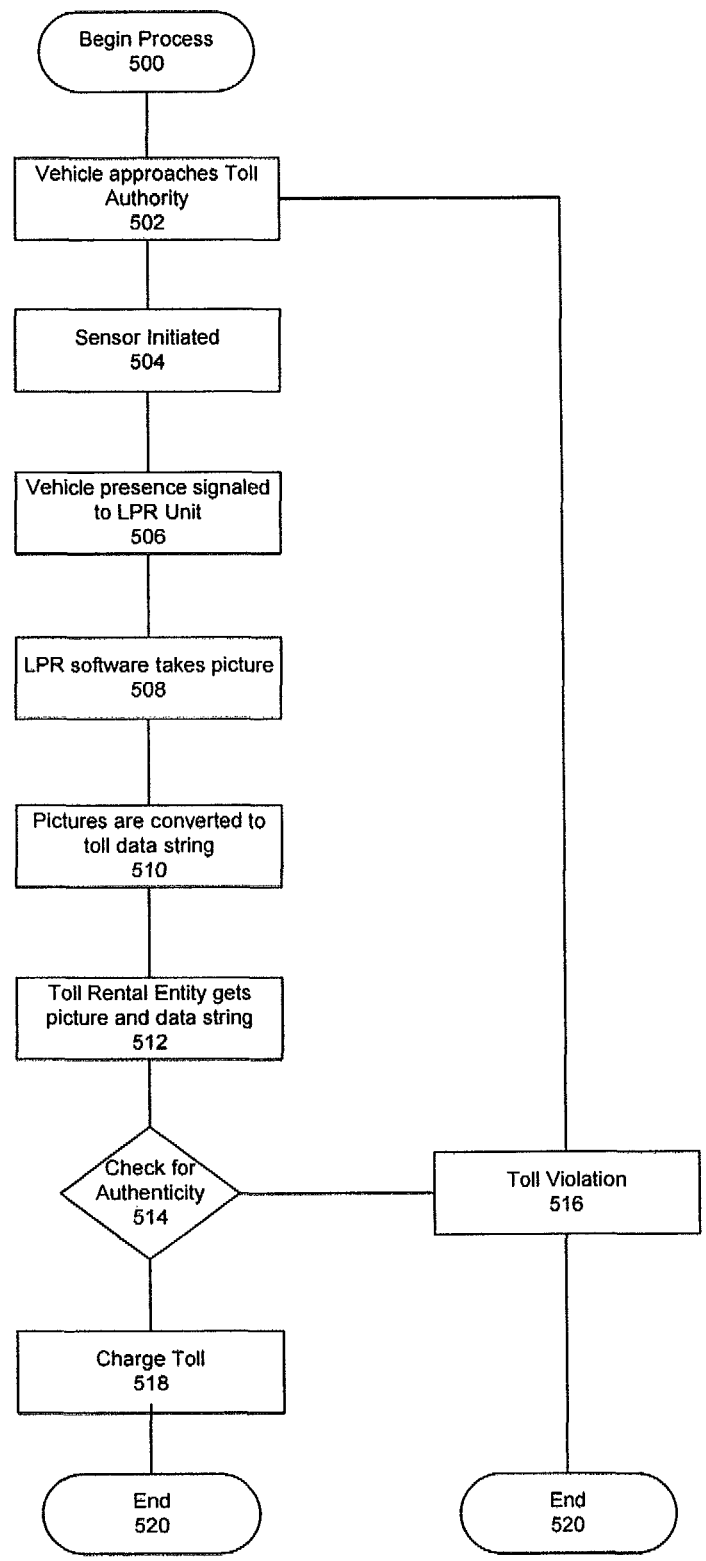
FIG. 5 depicts a flow diagram illustrating a method in accordance with an embodiment of the present invention.

Referring now to FIG. 5, a flow diagram of a method 500 of an embodiment of the present invention is shown. To access tolls incurred by vehicles, the toll rental entity, or other entity, equips the toll authorities with LPR modules. At step 502, a vehicle approaches the toll authority after which the sensor is initiated (step 504). At step 506, the presence of a vehicle is signaled to the LPR module. At step 508, LPR software activates the illumination (invisible IR in most cases) and takes pictures of the front and/or rear license plates of vehicles from the LPR camera. The images of the vehicle include the plate and the pixel information provided by the LPR unit's image processing hardware (PC adapter). At step 510, the LPR software analyzes the image with different image processing software algorithms, enhances the image, detects the vehicle license plate position, extracts the license plate string, and identifies the fonts using special artificial intelligence methods (such as Neural Networks). At step 512, the toll rental entity captures the pictures. At step 514, the toll rental entity performs an authentication procedure in the toll rental entity server. If the vehicle license plate number is listed in the toll rental entity database, the vehicle will be charged for the toll usage (step 518). The process ends at step 520. If the vehicle license plate number is not listed in the toll rental entity database will be marked as toll violation (step 516) and the process proceeds to step 502.

Figure 6A:
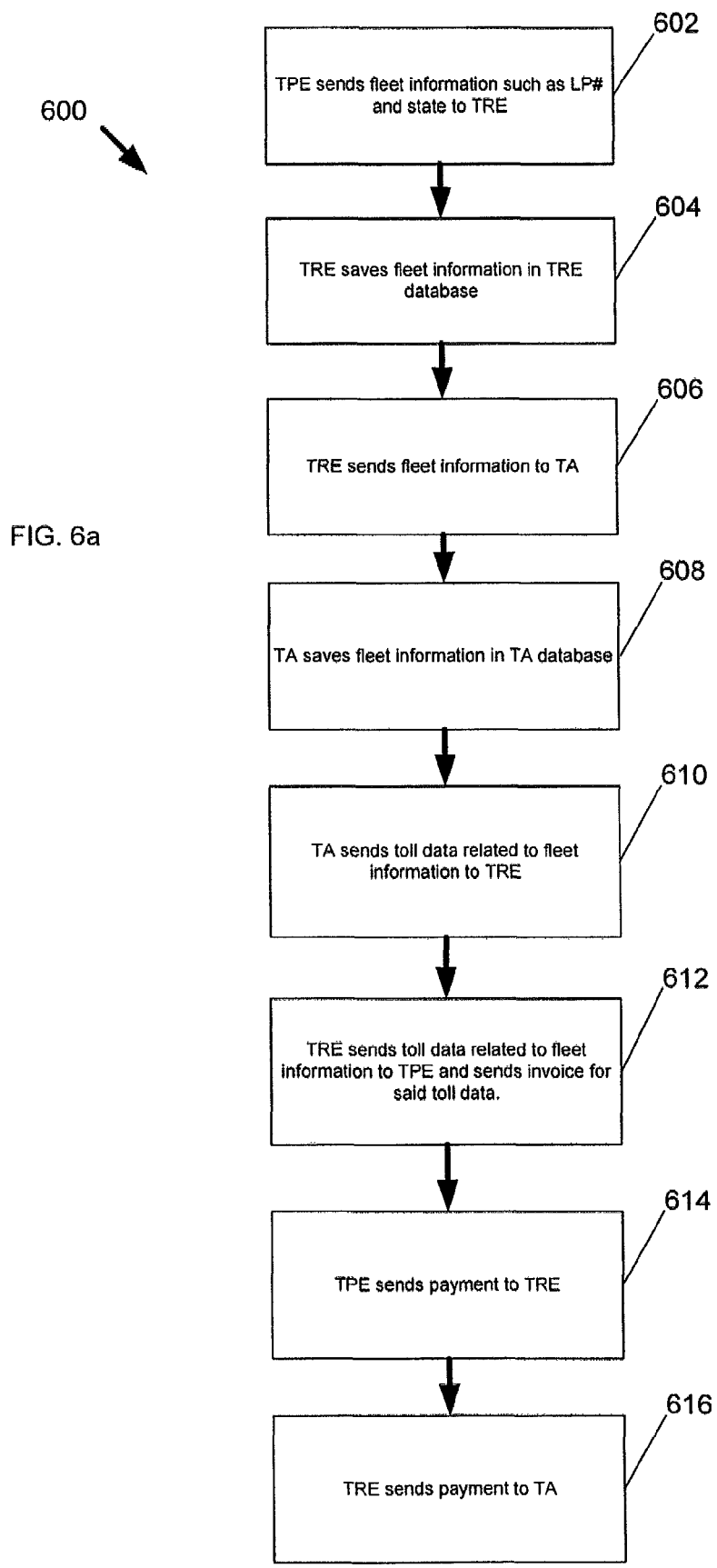
FIG. 6a depicts a flow chart for billing tolls in accordance with an embodiment of the present invention.

Referring now to FIG. 6a, a flow chart 600 for billing tolls for fleets comprises a third party entity that sends fleet information such as license plate numbers and states of each transport owned and/or associated with the fleet to a toll rental entity in step 602. The toll rental entity saves the fleet information in a toll rental entity database in step 604, and sends the fleet information to a toll authority in step 606. In steps 608 and 610, respectively, the toll authority saves the fleet information in a toll authority database, and sends toll data related to the fleet information to the toll rental entity. The toll rental entity sends the toll data and an invoice for the toll data to the third party entity at step 612, the third party entity sends a payment to the toll rental entity at step 614, and the toll rental entity sends the payment to the toll authority at step 616.

In alternate embodiments of the present invention, the toll rental entity may directly send the fleet information to the toll authority without or before saving the fleet information. Further, the toll authority may send the toll data related to the fleet information to the toll rental entity without or before saving the fleet information in the toll authority database. Also, all, or a portion of, the data or information mentioned herein can be stored in one or more of the described databases.

In further alternate embodiments of the present invention, a third party entity sends fleet license plate numbers, state information, and the like as toll data to the toll rental entity which saves this data in a database and/or transfers it to the toll authority which stores it in a database. As the fleet uses the toll authority's toll gates or lanes, the toll authority compares the fleet usage information with information stored in their database and sends this usage information, a time and date of the usage and the like to the toll rental entity.

In other embodiments of the present invention, charges associated with such usage may be sent by the toll authority to the toll rental entity. This data is stored in a database, which may be the same database the fleet information is stored in, and is sent to the third party entity. The third party entity sends a service request to the toll rental entity and is stored in a database which may be the same as the aforementioned database. A check is performed to determine if the service request is found. If it is, a notification and a payment are sent to the toll authority along with service details. Such a payment may be made immediately or after some time has elapsed. If the service request is not found, a violation is noted and stored in a different or in a same database as previously mentioned, and is sent to the third party entity. In this scenario, a fleet is proactively registered by the toll rental entity as a service request for a rental agreement may not be sent to the toll authority.

Figure 6B:
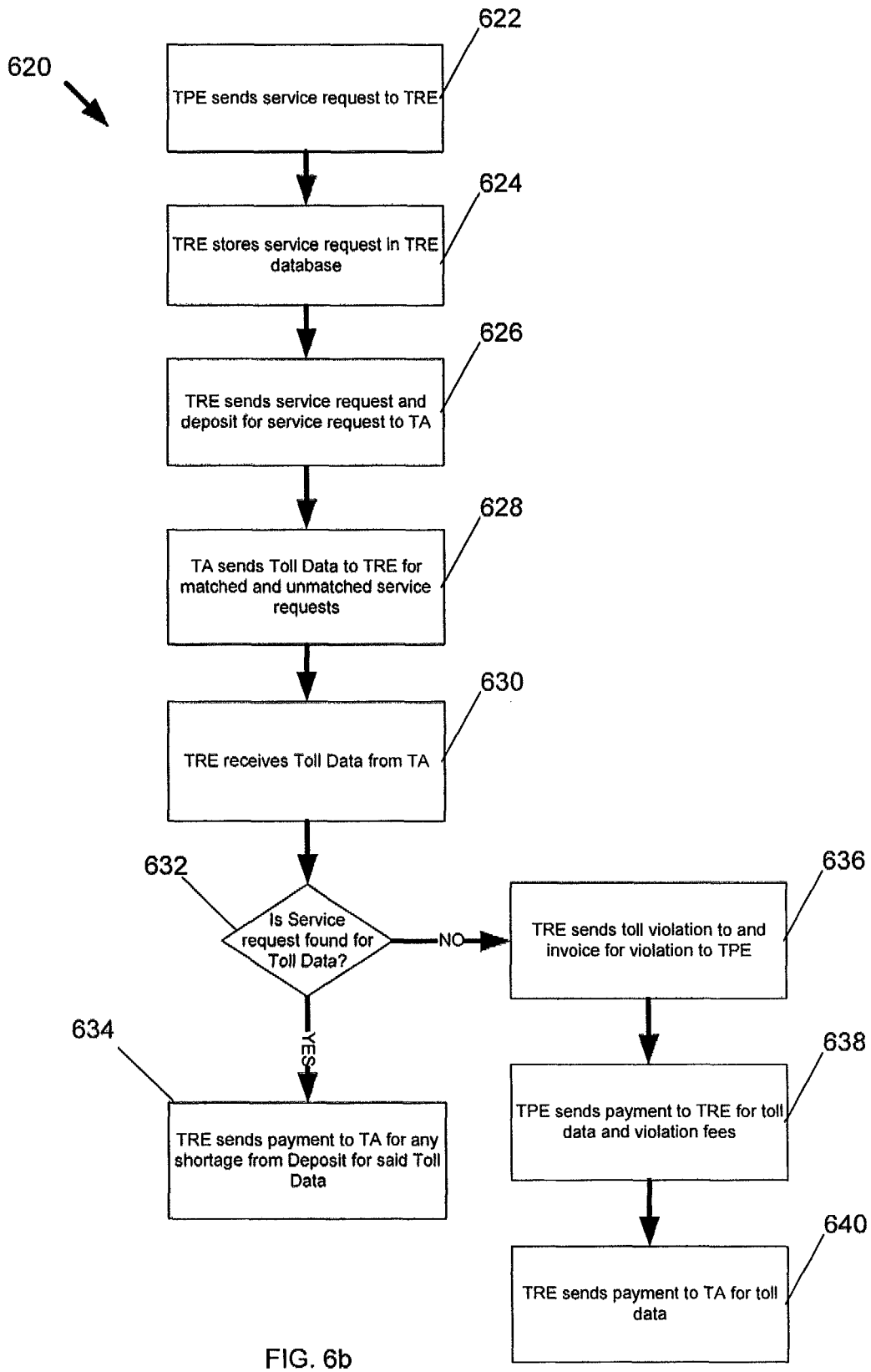
FIG. 6b depicts an alternate flow chart for billing tolls in accordance with an embodiment of the present invention.

Referring now to FIG. 6b, a flow chart 620 for billing tolls comprises a third party entity that sends a service request to a toll rental entity at step 622. At steps 624 and 626, respectively, the toll rental entity stores the service request in a toll rental entity database, and sends a service request and a deposit for the service request to a toll authority. At step 628 the toll authority sends toll data to the toll rental entity for matched and unmatched service requests, and at step 630 the toll rental entity receives the toll data from the toll authority. At step 632, a check is made in order to determine if the service request is found for the toll data. If it is, the toll rental entity sends a payment to the toll authority for any shortage from a deposit account for the toll data at step 634. If the service request is not found for the toll data, the toll rental entity sends a toll violation and an invoice for the toll violation to the third party entity at step 636. The third party entity sends a payment to the toll rental entity for toll data and violation fees, and the toll rental entity sends the payment to the toll authority for the toll data in steps 638 and 640, respectively.

In alternate embodiments of the present invention, a system for billing tolls accumulated during a rental period comprises a third party entity, a toll authority, and a toll rental entity coupled to the third party entity and to the toll authority, wherein the third party entity sends a request for service to the toll rental entity, wherein the toll rental entity sends the request for service during the rental period to the toll authority, wherein the toll authority stores the request, wherein the toll authority sends toll data to the toll rental entity based on the request, wherein the toll rental entity sends toll rental data to the third party entity based on the toll data, and wherein the third party entity generates a bill based on the toll rental data. In this scenario, a service request for a rental agreement is sent to the toll authority.

In the system, the third party entity receives information related to an individual or an entity wishing to rent a transport, wherein the information includes information of the individual or the entity and information regarding the transport, and wherein the individual's information includes at least one of: the individual's name, the individual's address, the individual's driver license number, the individual's driver license state, the individual's credit card number, the individual's debit card number, the individual's electronic account number, the individual's insurance information, the individual's email address, and the individual's phone number.

The entities' information includes at least one of: a name of the entity, an address of the entity, a phone number of the entity, an email address of the entity, a contact person for the entity, an email address of the contact person, a tax identification number, a credit card number for the entity, and a bank number for the entity, wherein the information regarding the transport includes at least one of: an owner of the transport, a license plate number of the transport, a vehicle identification number of the transport, an identification of the number (via, for example, the use of radio frequencies, nanotechnology, and the like), a type of the transport, a color of the transport, a year of manufacture of the transport, and a condition of the transport, wherein the request for service includes at least one of: an individual's name requesting the service, a license plate number of a transport that is to be utilized, a payment for the service, and rental contract information related to the transport, wherein the rental contract includes at least one of: a start date and a start time, and an end date and an end time, wherein service begins at a date and a time that the transport leaves a particular area, and wherein service ends at a date and a time that the transport returns to the particular area, and wherein service begins at a date and a time that the transport leaves a particular area, and wherein service ends at a date and a time that the transport returns to a different area.

The toll data includes at least one of: information related to transport, information related to a license plate of the transport, a location of the transport, a direction of the transport, a time stamp related to the transport, and a toll amount incurred by the transport, wherein the toll rental data includes information related to the transport based on at least one of: a reading of a license plate of the transport, to an individual associated with the request, and to an entity associated with the request, and wherein the third party entity is at least one of: a rent-a-car entity, an entity that rents transports comprising license plates, an entity that rents transports comprising information that can be acquired, an entity or individual that owns transports, an entity or individual that leases transports, an entity or individual that loans transports, an entity or individual that lends transports, and an entity or individual that operates transports.

The third party entity generates a bill in at least one of: before the rental period, during the rental period, at an end of the rental period, and at a time after the end of the rental period, wherein the request, the toll data, and the toll rental data is sent in at least one of a following medium: wireless, and wired, and wherein the bill is generated to at least one of: a transport operator, a transport or entity renter, a transport or entity owner, a transport or entity leaser, a transport or entity loaner and, a transport or entity lender.

Figure 6C:
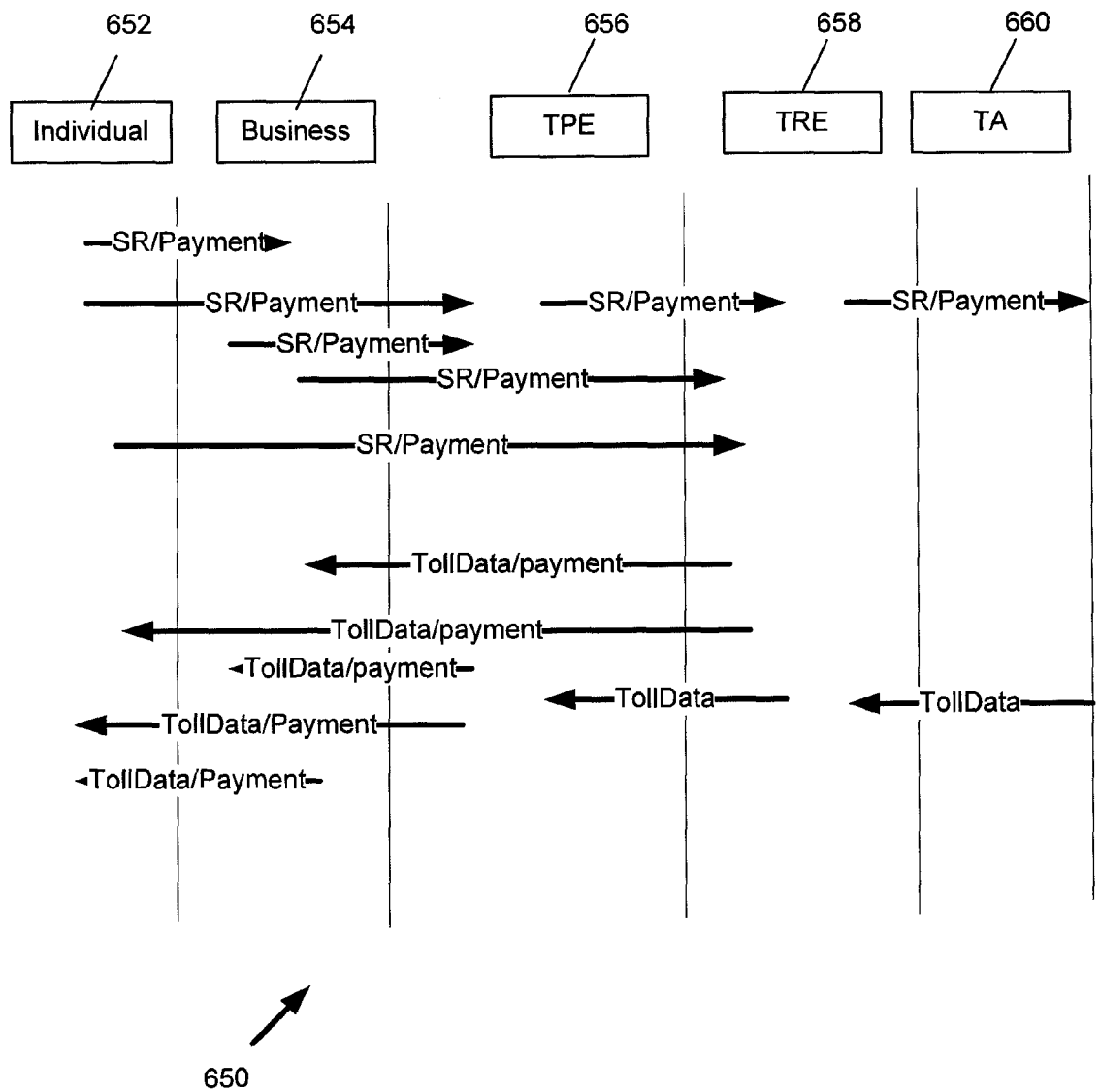
FIG. 6c depicts a message flow for billing tolls in accordance with an embodiment of the present invention.

Referring now to FIG. 6c, a message flow 650 depicts originating sources and terminating destinations for a number of messages. A service request and payment message may be sent in the following scenarios: by an individual 652 to a business 654, by the individual to a third party entity 656, by the third party entity to a toll rental entity 658, by the toll rental entity to a toll authority 660, by the business to the toll rental entity, and by the individual to the toll rental entity. In response to the service request and payment message, a toll data and payment message or a toll data message may be sent in the following scenarios: by a toll rental entity 658 to a business 654, by the toll rental entity to an individual 652, by a third party entity 656 to the business, by a toll authority 660 to the toll rental entity, by the toll rental entity to the third party entity, by the third party entity to the individual, and by the business to the individual.

In alternate embodiments of the present invention, the service request and the payment, the toll data and the payment, and/or the toll data may be sent and/or received by any of the sources and destinations. Further, the service request and the payment and/or the toll data and the payment may be sent independently or not at all.

Figure 6D:
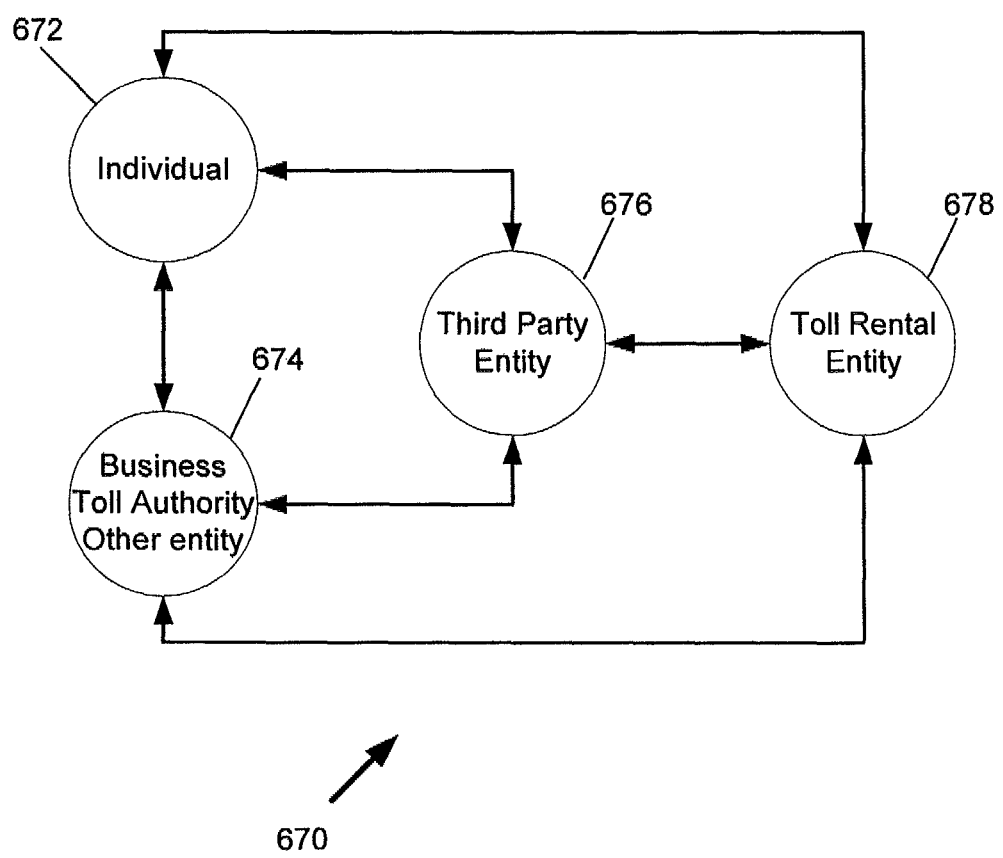
FIG. 6d depicts a relational system in accordance with an embodiment of the present invention.

Referring now to FIG. 6d, a relational system in accordance with an embodiment of the present invention is depicted. The system includes an individual 672, a business, toll authority, or other entity (such as a toll tag or device manufacturer, a mobile device manufacturer, etc,) 674, a third party entity 676, and a toll rental entity 678. Each of these entities or individual can communicate with one another and may perform a variety of actions such as requesting service, performing billing functions, accumulating and providing metrics, and the like.

Figure 7:
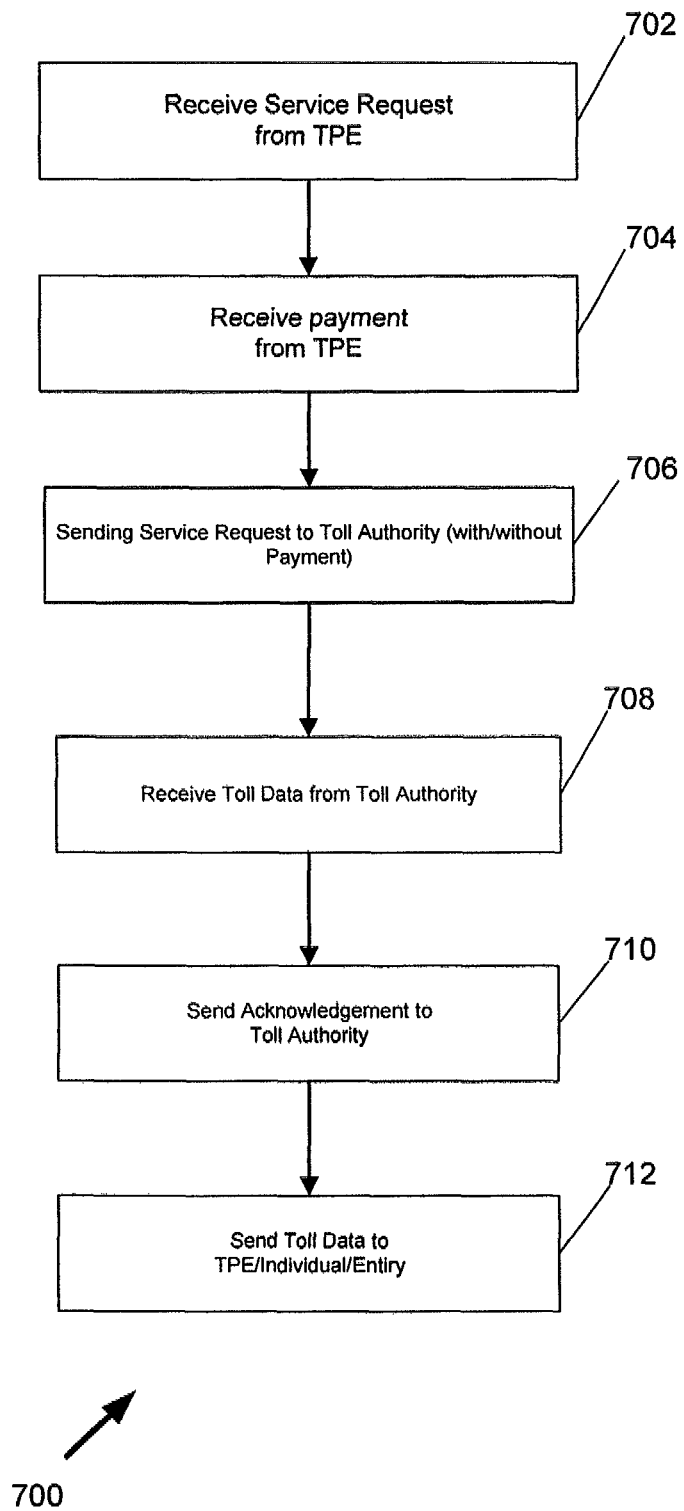
FIG. 7 depicts a flow diagram illustrating a method for billing tolls in accordance with an embodiment of the present invention.

Referring now to FIG. 7, a method 700 for billing tolls comprises receiving a service request from a third party entity at step 702, receiving a payment from the third party entity at step 704, sending a service request to a toll authority (with a payment or without a payment) at step 706, receiving toll data from the toll authority at step 708, sending an acknowledgement to the toll authority at step 710, and sending the toll data to the third party entity (or to the individual and/or to another entity) at step 712.

In an alternate embodiment of the present invention, a method for billing tolls accumulated during at least one of: a rental period and a service period comprises sending a service request to a toll authority, wherein the service request is associated with a license plate number, receiving license plate images from the toll authority, providing a charge during the rental period if one of the received license plate images equates to the license plate number associated with the service request, and providing a violation during the rental period if one of the received license plate images does not equate to the license plate number associated with the service request. The transport's service period may last for a longer time frame than the rental period which may occur if the transport's service area (for example, city or state) differs from the rental area. For example, the service period may last for three weeks in the Dallas area. However, a rental period within the service period may occur when the transport is driven to Houston for a few days. In such a scenario, the service request, usage, and toll charges may differ than those with the service period. In another embodiment, a method for billing tolls accumulated during at least one of: a rental period and a service period, the method comprises sending a service request associated with a license plate number to a toll authority, wherein the service request is associated with a license plate number, receiving a plurality of license plate images from the toll authority, comparing license plate numbers corresponding to the received plurality of license plate images with the license plate number associated with the service request, providing a charge during the rental period if one of the charging an account responsive to a license plate number corresponding to a license plate image of the received plurality of license plate received license plate images matching the license plate number associated with the service request equates to the license plate number associated with a the service request, and charging a violation fee responsive to a license plate number corresponding to a license plate image of the received plurality of license plate images not matching the license plate number associated with the service request.

The method comprises receiving time stamps and locations from the toll authority, collecting the license plate images, the time stamps, and the locations when transports utilize the toll authority, and sending a payment associated with the license plate number when the service request to the toll authority is sent, wherein the payment is sent in lieu of providing the charge during at least one of the periods, wherein the payment is sent in lieu of providing the violation during at least one of the periods. For example, the payment may be sent before a proper charge or a violation has occurred.

The method comprises providing a charge during at least one of the periods if one of the received license plate images is similar to the license plate number associated with the service request and providing a violation during at least one of the periods if one of the received license plate images is not similar to the license plate number associated with the service request. We may get input from a third party.

Figure 8:
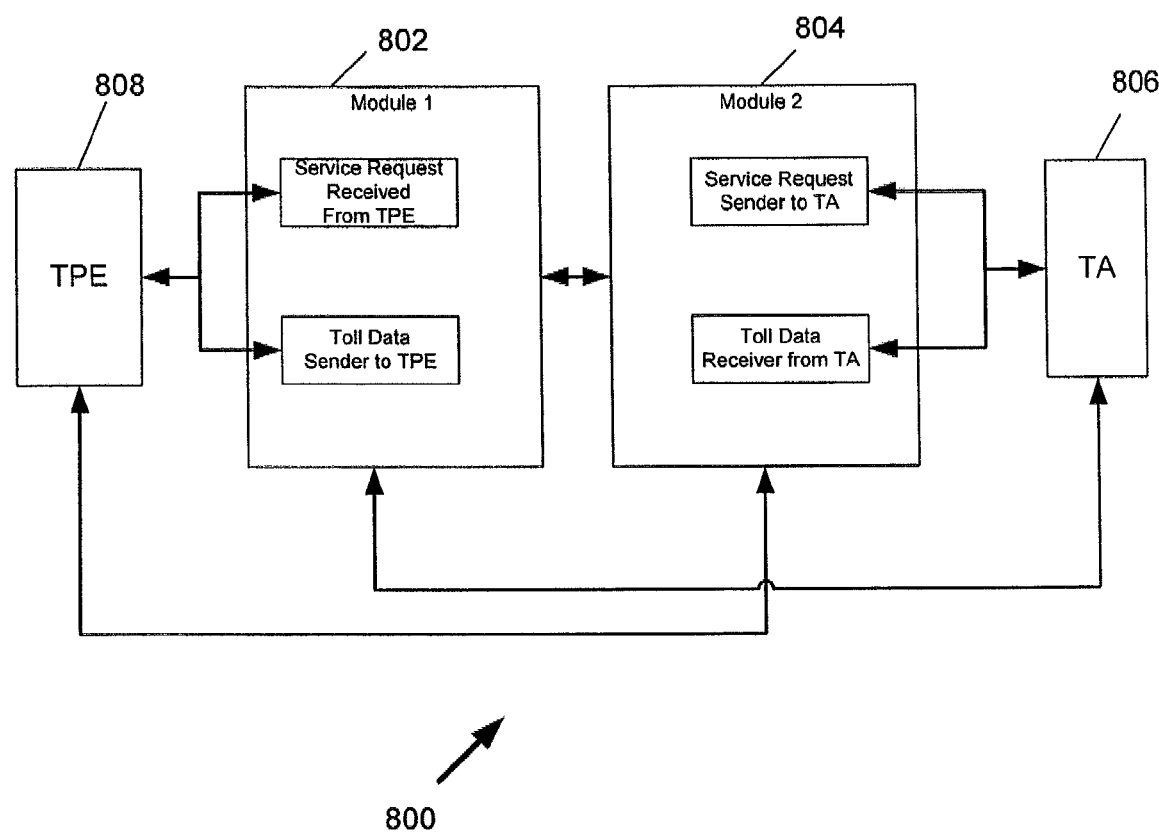
FIG. 8 depicts a system with emphasis on the toll rental entity in accordance with an embodiment of the present invention.

Referring now to FIG. 8, a system 800 comprises a first module 802 that receives a service request, wherein the service request is associated with a license plate number, and a second module 804 that sends the service request and a payment associated with the service request, wherein the payment is utilized to provide a service at a toll authority 806. The payment can be sent prior to the service, during the service, after the service, for a certain period, for a rental period, for a service period, and by at least one of: at least one toll rental entity, and at least one third party entity.

The first module 802 receives the service request from at least one of: at least one third party entity 808, and at least one toll authority 806, wherein the first module sends information to the third party entity, wherein the second module 804 sends the service request to the toll authority, and wherein the second module receives information from the toll authority. The system may also comprise a third module (such as an individual, a business, or other entity) that receives information from at least one of: the first module, and the second module. Although depicted as separate modules, the first module 802 and the second module 804 may be combined into one module or may be kept separate and be a part of another module (not shown).

Figure 9:
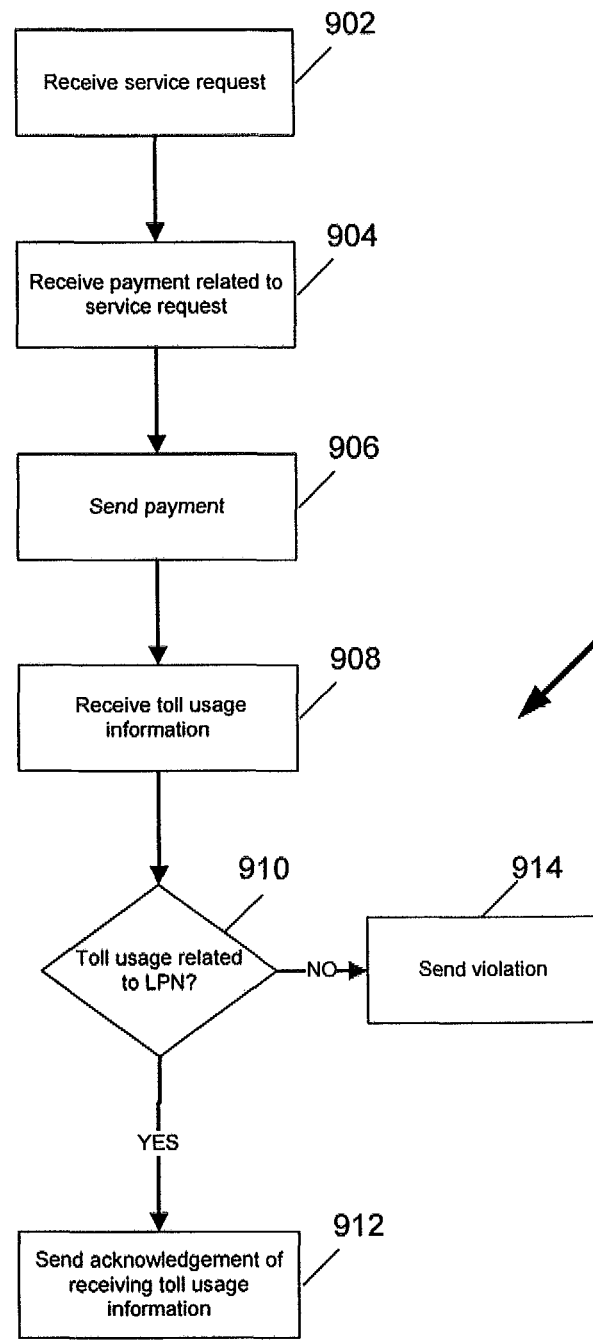
FIG. 9 depicts a flow diagram illustrating a computer readable medium in accordance with an embodiment of the present invention.

Referring now to FIG. 9, a flow chart 900 of a computer readable medium of the present invention is depicted. The computer readable medium comprises instructions for: receiving a service request comprising at least a license plate number 902, receiving a payment related to the service request 904, sending a payment to a toll authority 906, receiving toll data such as toll usage information from the toll authority 908, and determining if the if the toll usage is related to the license plate number 910. If the toll usage is related to the license plate number, sending an acknowledgement to the toll authority 912, and if the toll usage is not related to the license plate number, sending a violation to the toll authority 914. In another embodiment of the present invention, if the toll usage is not related to the license plate number, sending a notification of a license plate number that is not found to the toll authority.

The computer readable medium comprises instructions for receiving the service request before a transport is rented, wherein the payment coincides with a first rate, and comprises instructions for receiving the service request after a transport is rented, wherein the payment coincides with a second rate. For example, an individual may not have requested service upon renting the transport but later decides to request service and thus may be faced with a higher payment and/or with different terms.

Figure 10:
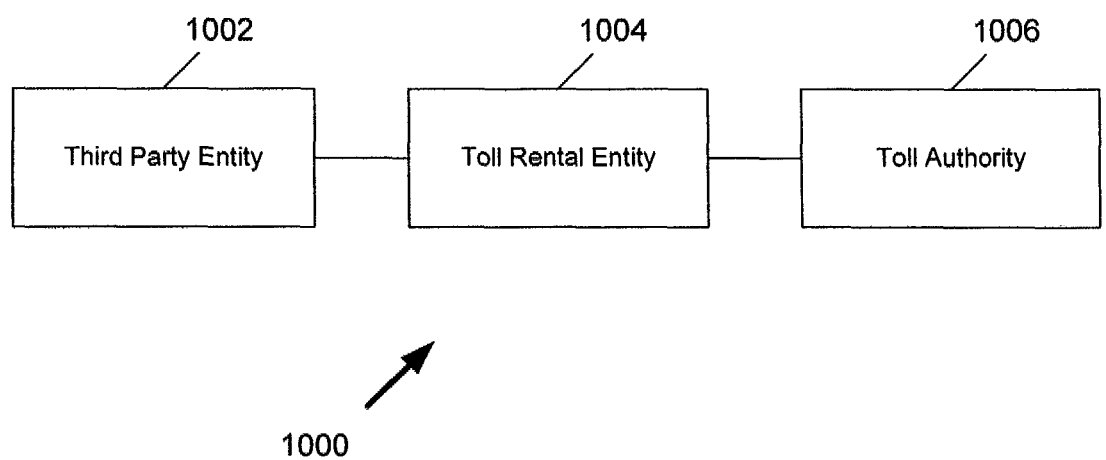
FIG. 10 depicts a flow diagram illustrating a service request and payment being sent in accordance with an embodiment of the present invention.

Referring now to FIG. 10, a system 1000 for billing tolls accumulated during a service period comprises a third party entity 1002, a toll rental entity 1004 and a toll authority 1006, wherein the toll rental entity is coupled to the third party entity and to the toll authority, wherein the third party entity sends a request for service to the toll rental entity, wherein the toll rental entity sends the request for service during the service period to the toll authority, and wherein the toll authority sends toll data and a bill to the toll rental entity based on the request. For example, a third party entity may be a rental car company, boat rental company, fleet trucking company, plane rental company, train rental company, bus rental company, new car fleet dealer, used car fleet dealer, transport manufacturer, etc. In other embodiments of the present invention, a system for billing tolls accumulated during a service period, comprises a third party entity, a toll authority, a toll rental entity adapted to receive a request for service from the third party entity, send the request for service during the service period to the toll authority, and receive, based on the request, toll data and a bill from the toll authority.

Figure 11:
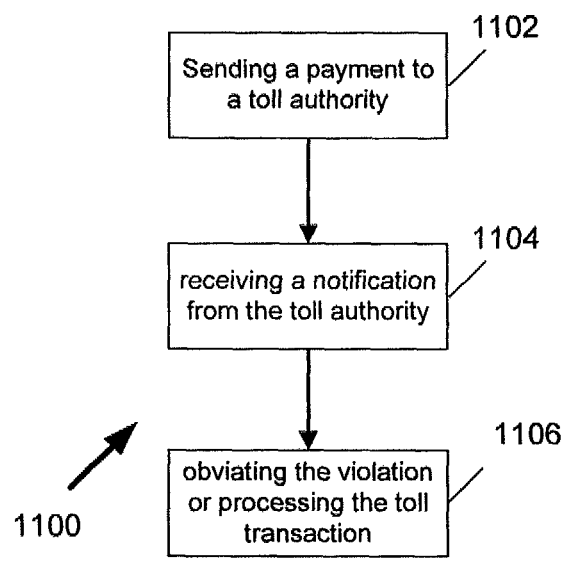
FIG. 11 depicts a flow diagram illustrating a computer readable medium in accordance with an alternate embodiment of the present invention.

Referring now to FIG. 11, a flow chart 1100 of a computer readable medium of the present invention is depicted. The computer readable medium comprises instructions for: sending a payment to a toll authority 1102, and receiving a violation notification or toll transaction notification from the toll authority 1104, wherein the violation identifies a transport, and obviating the violation or processing the toll transaction if the payment was intended for the transport 1106.

Although an exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the described or depicted elements. Also, these capabilities may be performed in the current manner or in a distributed manner and on, or via, any device able to provide and/or receive information. Further, although depicted in a particular manner, various modules or blocks may be repositioned without departing from the scope of the current invention. For example, information being sent to the toll rental entity can be sent to the third party entity or to multiple third party entities or may be sent to one of the entities in lieu of the other. Still further, although depicted in a particular manner, a greater or lesser number of elements and connections can be utilized with the present invention in order to accomplish the present invention, to provide additional known features to the present invention, and/or to make the present invention more efficient. For example, a toll tag or other electronic device can be used to send, receive, and/or store any of the data described or depicted herein. Also, the information sent between various elements described or depicted herein, can be sent via a wireless source and/or a wired source and via a plurality of protocols.

It should be emphasized that the terms "comprise," "comprises," and "comprising," when used herein, are taken to specify the presence of stated features, integers, steps, or components, but do not preclude the presence or addition of one or more other features, integers, steps, components or groups thereof.

The previous Detailed Description is of embodiment(s) of the invention. The scope of the invention should not necessarily be limited by this Description. The scope of the invention is instead defined by the following claims and the equivalents thereof.

What is claimed is:

1. A system for providing third-party-operated vehicle users an automatic toll service, the system comprising:
   a toll authority;
   a third party entity;
   a toll rental entity integrated within the third party entity and being operable to receive license plate numbers of third-party-operated vehicles from the third party entity and transfer the license plate numbers of third-party-operated vehicles to the toll authority;
   wherein the toll rental entity sends to the toll authority, pre-payment for future toll usage by third-party-operated vehicles, wherein the pre-payment is sent by the toll rental entity to the toll authority prior to the third-party-operated vehicles using the toll authority;
   wherein the toll rental entity forward a service request to the toll authority, wherein the service request comprises subscription for the automatic toll service with the toll authority by the third-party-operated vehicles for which license plate numbers have been transferred to the toll authority;
   wherein the toll authority is operable to identify license plate numbers of vehicles using the toll authority and determine if the identified license plate numbers match the license plate numbers of the third-party-operated vehicles; and
   responsive to a determination that the identified license plate numbers match the license plate numbers of the third-party-operated vehicles, send, by a processor, toll usage data associated with the license plate numbers of the third-party-operated vehicles for billing.

2. The system of claim 1, wherein the service request includes at least one of:
   an individual's name requesting the service;
   a license plate number of the third-party-operated vehicle that is to be utilized;
   a payment for the service; and
   rental contract information related to the third-party-operated vehicle, wherein the rental contract includes at least one of:
   a start date and a start time; and
   an end date and an end time.

3. The method of claim 1, wherein the service begins at a date and a time that the third-party-operated vehicle leaves a particular area, and wherein the service ends at a date and a time that the third-party-operated vehicle returns to the particular area.

4. The method of claim 1, wherein the toll usage data includes at least one of:
   information related to a third-party-operated vehicle;
   information related to the license plate number of the third-party-operated vehicle;

a location of the third-party-operated vehicle;
a direction of the third-party-operated vehicle;
a time stamp related to the third-party-operated vehicle; and
a toll amount incurred by the third-party-operated vehicle.

5. The system of claim 1, wherein the third party entity receives information related to an individual renting the third-party-operated vehicle.

6. The system of claim 5, wherein the information includes at least one of:
the individual's name;
the individual's address;
the individual's driver license number;
the individual's driver license state;
the individual's credit card number;
the individual's debit card number;
the individual's electronic account number;
the individual's insurance information;
the individual's email address; and
the individual's phone number.

7. The system of claim 1, wherein the toll authority comprises:
an image capture module operable to capture license plate images of vehicles using the toll authority; and
wherein the image capture module is operable to extract the license plate numbers from the captured license plate images.

8. The system of claim 1, wherein the toll rental entity comprises:
a toll authority interface adapted to communicate with the toll authority; and
at least one database.

9. The system of claim 1, wherein the toll rental entity comprises a server.

10. The system of claim 8, wherein the communication between the toll authority and the toll rental entity comprises pulling the data from the toll authority.

11. The system of claim 8, wherein the communication between the toll authority and the toll rental entity comprises pushing the data to the toll rental entity.

12. The system of claim 8, wherein the communication between the toll authority and the toll rental entity occurs in real-time.

13. The system of claim 8, wherein the communication between the toll authority and the toll rental entity occurs at predefined regular intervals.

14. The system of claim 1, wherein the third party entity comprises at least one of:
a rent-a-car entity;
an entity that rents vehicles comprising license plates;
an entity that rents vehicles comprising information that can be acquired;
an entity or individual that owns vehicles;
an entity or individual that leases vehicles;
an entity or individual that loans vehicles;
an entity or individual that lends vehicles; and
an entity or individual that operates vehicles.

15. A method for providing third-party-operated vehicle users an automatic toll service, the method comprising:
receiving, by a toll rental entity computer, license plate numbers of third-party-operated vehicles;
transferring, by the toll rental entity computer to a toll authority computer, the license plate numbers of third-party-operated vehicles;
sending, by the toll rental entity computer to the toll authority computer, pre-payment for future toll usage by third-party-operated vehicles, wherein the pre-payment is sent by the toll rental entity computer to the toll authority computer prior to the third-party-operated vehicles using the toll authority;
forwarding a service request to the toll authority computer, wherein the service request comprises subscription for the automatic toll service with the toll authority by the third-party-operated vehicles for which license plate numbers have been transferred to the toll authority computer;
identifying, by the toll authority, license plate numbers of vehicles using the toll authority;
determining, by the toll authority computer, if the identified license plate numbers match the license plate numbers of the third-party-operated vehicles; and
responsive to a determination that the identified license plate numbers match the license plate numbers of the third-party-operated vehicles, sending toll usage data associated with the license plate numbers of the third-party-operated vehicles to a third party entity computer in which the toll rental entity computer is integrated for billing.

16. The method of 15, comprising receiving time stamps and location information from the toll authority computer.

17. The method of claim 16, comprising collecting the time stamps and the location information when the third-party-operated vehicles utilize the toll authority.

18. The method of claim 15, further comprising:
sending, by the third party entity computer to the toll rental entity computer, a payment.

19. The method of claim 15, further comprising:
generating, by the third party entity computer, a bill for the toll usage by a third-party-operated vehicle customer.

20. An article of manufacture for providing third-party-operated transport users an automatic toll service, the article of manufacture comprising:
at least one computer readable medium;
processor instructions contained on the at least one computer readable medium, the processor instructions configured to be readable from the at least one computer readable medium by at least one processor and thereby cause the at least one processor to operate as to perform the following steps:
receiving, by a toll rental entity, license plate numbers of third-party-operated vehicles;
transferring, by the toll rental entity to a toll authority, the license plate numbers of third-party-operated vehicles;
sending, by the toll rental entity to the toll authority, pre-payment for future toll usage by third-party-operated vehicles, wherein the pre-payment is sent by the toll rental entity to the toll authority prior to the third-party-operated vehicles using the toll authority;
forwarding a service request to the toll authority, wherein the service request comprises subscription for the automatic toll service with the toll authority by the third-party-operated vehicles for which license plate numbers have been transferred to the toll authority;
identifying, by the toll authority, license plate numbers of vehicles using the toll authority;
determining, by the toll authority, if the identified license plate numbers match the license plate numbers of the third-party-operated vehicles; and
responsive to a determination that the identified license plate numbers match the license plate numbers of the third-party-operated vehicles, sending toll usage data associated with the license plate numbers of the third-party-operated vehicles to a third party entity in which the toll rental entity is integrated for billing.

* * * * *